United States Patent [19]

Poore et al.

[11] Patent Number: 5,188,253

[45] Date of Patent: Feb. 23, 1993

[54] CONTAINER AND METHOD OF MANUFACTURING THE SAME

[75] Inventors: Cyril Poore, New Malden; Bernard Sams, London, both of England

[73] Assignee: Duma AB, Sweden

[21] Appl. No.: 651,461

[22] Filed: Feb. 6, 1991

[30] Foreign Application Priority Data

Feb. 6, 1990 [SE] Sweden .................. 9000410

[51] Int. Cl.$^5$ .................. B65D 1/06; B65D 25/10; B65D 51/26

[52] U.S. Cl. .................. 220/212; 220/254; 220/361; 220/578; 215/2; 215/228; 215/32; 215/231; 215/364

[58] Field of Search .................. 220/212, 254, 319, 361, 220/625, 578, 529, 530; 215/2, 228, 205, 32, 231, 364

[56] References Cited

U.S. PATENT DOCUMENTS

| | | | |
|---|---|---|---|
| 650,617 | 5/1900 | Salomon | 215/364 X |
| 785,656 | 3/1905 | Booth | 215/2 |
| 1,660,606 | 2/1928 | Evans | 215/2 X |
| 1,966,611 | 7/1934 | Cobel | 215/364 X |
| 2,191,434 | 2/1940 | Alder | 220/625 X |
| 2,292,413 | 8/1942 | Taylor | 220/212 X |
| 3,040,897 | 6/1962 | Holman | 215/231 X |
| 3,204,359 | 9/1965 | Kurokawa | 215/364 X |
| 3,245,565 | 4/1966 | Zeppenfeld et al. | 220/212 X |
| 3,331,528 | 7/1967 | Racek | 220/319 X |
| 3,380,624 | 4/1968 | Lincoln et al. | 220/578 |
| 3,433,378 | 3/1969 | Ross | 215/2 X |
| 3,481,712 | 12/1969 | Bernstein et al. | 215/228 X |
| 3,902,617 | 9/1975 | Valyi | 215/2 |
| 3,980,193 | 9/1976 | White | 215/205 |
| 4,000,839 | 1/1977 | Tecco et al. | 220/254 X |
| 4,040,549 | 8/1977 | Sadler | 220/212 X |
| 4,127,211 | 11/1978 | Zerbey | 220/212 |
| 4,131,211 | 12/1978 | Corbic | 215/2 |
| 4,260,065 | 4/1981 | van Cromvoirt | 215/2 |
| 4,684,042 | 8/1987 | Strickler | 220/578 X |
| 4,703,610 | 11/1987 | Bach | 215/2 X |
| 4,746,017 | 5/1988 | Howard et al. | 215/2 X |
| 4,817,815 | 4/1989 | Stahlecker | 220/209 |
| 4,871,077 | 10/1989 | Ogden et al. | 215/366 |

FOREIGN PATENT DOCUMENTS

| | | |
|---|---|---|
| 0161357 | 11/1921 | European Pat. Off. . |
| 0076418 | 4/1983 | European Pat. Off. . |
| 0105858 | 4/1984 | European Pat. Off. . |
| 0378245 | 1/1990 | European Pat. Off. . |
| 2501950 | 4/1977 | Fed. Rep. of Germany . |
| 725929 | 5/1932 | France .................. 215/2 |
| 368689 | 7/1974 | Sweden . |

*Primary Examiner*—Allan N. Shoap
*Assistant Examiner*—Vanessa Caretto
*Attorney, Agent, or Firm*—Ostrolenk, Faber, Gerb & Soffen

[57] ABSTRACT

A container unit comprises an integrally formed container component (1) comprising a casing (20) and a closure (10), which includes a lid (11) initially sealed with an original seal (12). A separate bottom piece (30) for the container is permanently secured to the casing (20) of the container component containing the product, preferably by rotation-friction welding the bottom piece and the casing, both of which consist of polypropene. The component (1) is oriented with the closure (10) facing down and the product is poured in via the open end of the casing. The bottom piece is then placed in the open end of the container casing and rotation-friction welded to the casing. A partition (36) may be inserted in the casing to define a space for the product corresponding to the volume of the product.

9 Claims, 1 Drawing Sheet

CONTAINER AND METHOD OF MANUFACTURING THE SAME

The invention relates to a container unit and a method of manufacturing said container.

In order to simplify the manufacturing, filling and handling of originally sealed containers for tablets and the like, such as pharmaceutical tablets, a container unit and method of manufacturing the same are proposed.

According to the invention, a container component is used consisting of a container casing provided at one end with a permanently secured sealing means sealed with an original seal.

This component is oriented with the closure facing down and can then be filled with the desired product, i.e. tablets or the like. Thereafter a filler body or a partition may be inserted to adjusted the effective container volume to the actual product volume. A separate bottom piece can then be permanently secured to the open end of the casing. The bottom piece may be provided with a protuberance extending into the casing, said protuberance being dimensioned to fill out the free space above the product in the casing of the container unit. Such a protuberance may thus replace said filler body or partition.

The bottom piece is suitably provided with an axially externally exposed recess. This recess may be designed to form a space to receive a brochure or the like relating to the product in the container. The recess is suitably closed by a lid comprising a stopper to fit into the recess in the bottom piece. The stopper is suitably provided with a flange resting against the bottom piece around its recess. The bottom piece is suitably provided with a peripheral upset defining the support surface of the container unit, the flange on the stopper thus being recessed inside the support surface.

The length of the stopper is suitably adjusted to define a suitable depth for the space and possibly to define a free height in the container unit sufficient for the product volume.

The size of the stopper is suitably adjusted to the size of the opening at the neck of the container closure. The closure usually includes a lid which is used after the original seal has been broken. The original lid therefore normal has a tight snap-on fit to the neck of the container. However, this entails problems for those suffering from rheumatism or some other handicap.

For this reason the size of the stopper pertaining to the bottom piece has been adjusted to the size of the neck of the container, enabling it to be easily placed in the neck as a replacement for the original lid. The pharmacist/dispenser can open the original seal, for instance, cut the hinge of the original lid and remove it. He/she can then remove the stopper located in the bottom piece and insert it in or around the neck of the container to provide a loose fit. Thanks to its flange the stopper is then easy to grip when it is to be removed.

Thanks to the invention a colour can be selected for the bottom piece which will identify the product or type of product or will identify the manufacturer.

The invention will be described in the following by way of example with reference to the accompanying drawings.

Figure 1:
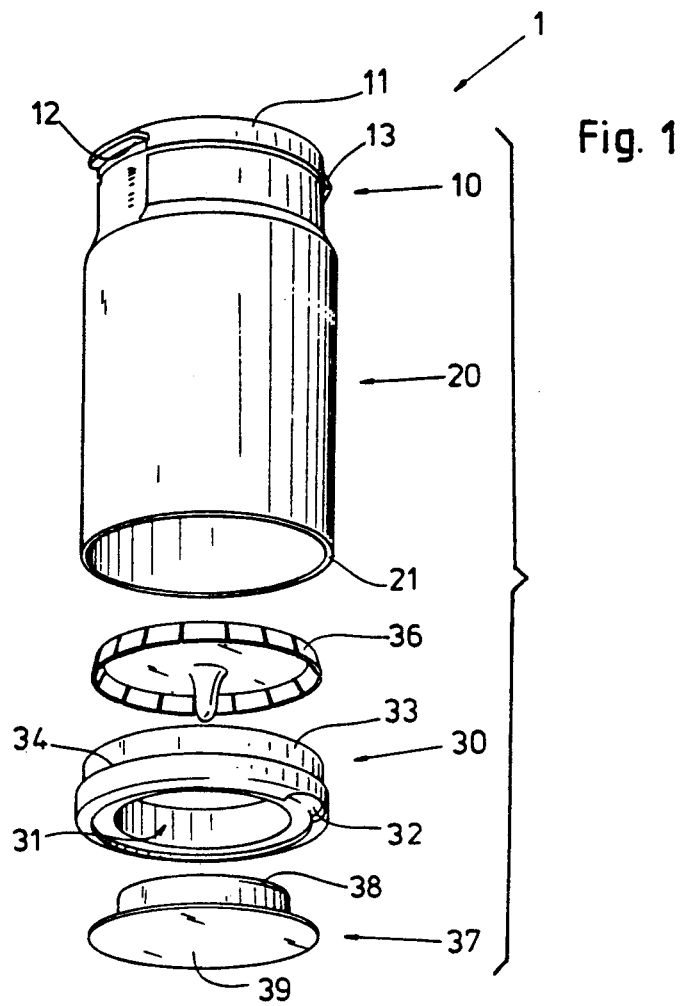
FIG. 1 shows a container unit according to the invention in exploded view.

FIG. 1 shows a container unit 1 comprising a circular-cylindrical casing 20 provided with an integrally formed closure 10 of rigid material consisting of a lid 11 attached via a hinge 13 so that it can be opened or closed, and an original seal 12.

When the container is to be filled, the container unit 1 is turned upside down and filled with the desired product. A partition 36 is then inserted far enough to come into contact with the product, and is then secured or blocked against the casing 20. A bottom piece 30 is then fitted on the open end of the casing, preferably by means of rotation-friction welding. The casing 20 and the bottom piece 30 are suitably made of polypropylene.

The bottom piece is provided with an externally exposed axial recess 31 in which the stopper 37 is placed. The stopper 37 comprises a protuberance 38 extending into the recess 31 of the bottom piece 30 and a flange 39 defining the depth to which the stopper 37 is inserted into the recess 31.

The bottom piece 30 is preferably provided with an indented rim around the recess 31 to take the flange 39 of the stopper 37. A thumb-grip recess 32 may be provided at the periphery of the bottom piece, to facilitate insertion of a fingernail under the flange 39 of the stopper 37 so that this can be removed from the bottom piece 30.

The depths of the recess 31 may be substantially greater than the length of the protuberance 38 on the stopper so that a space is defined between the stopper 37 and the bottom piece 30 for a pamphlet (not shown), preferably relating to the product in the container.

The bottom piece 30 has a protuberance 33 which extends into the container casing 20, and a shoulder 34 which forms a joint surface against the end 21 of the casing 20.

The partition 36 can be omitted in an alternative embodiment, the bottom piece 30 being instead provided with a protuberance 33 having an axial length such that the protuberance 33 fills the space in the casing 20 which is not taken up by the product inside.

Figure 2:
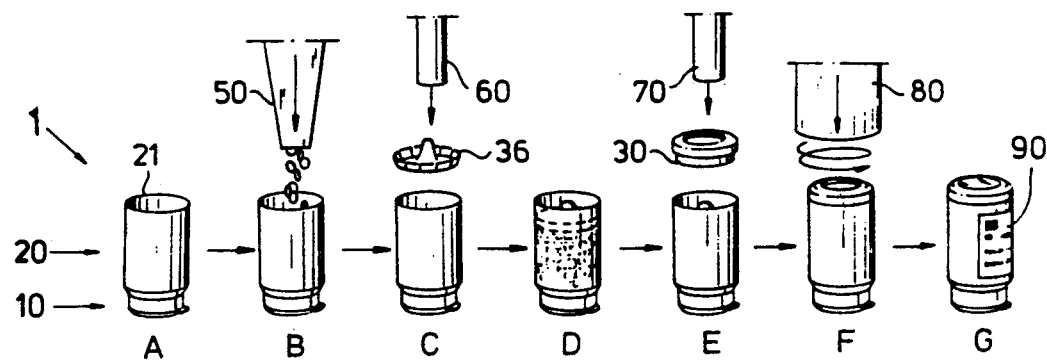
FIG. 2 shows a filling/manufacturing sequence for the container unit.

FIG. 2 shows the container component 1 oriented with the closure 10 facing down and the open end of the container casing 20 oriented up, in position A. The container component can now be inserted in a station B where product filling means 50 feed the product into the container component. The container component filled with the product is then transferred to a station C in which a partition 36 is inserted by insertion means 60, and fitted into the component 1 immediately above the product level inside, as indicated in step D. The bottom piece 30 is then applied on the container component by means of application means 70 in step E. In a following step, F, the bottom piece 30 is rotation-friction welded to the casing part 20 by welding means 80. The container filled with the product can then continue to other stations in which a pamphlet is inserted in the recess in the bottom piece 30 and a stopper inserted in the recess in the bottom piece 30, the bottom piece thus containing the pamphlet.

The container component is suitably a predetermined constant height, irrespective of the extent to which it is filled and the height of the bottom piece 30 from the support surface up to the shoulder 34 is also suitably of constant height irrespectively of the axial length of the protuberance 33 in the bottom piece. The container as a whole will thus have a constant height. This is an advantage for filling operations, packing the containers and when the containers are to be provided with labels or print indicating the contents thereof.

We claim:

1. A sealed plastic container for tablets or the like, comprising:
   a cylindrical casing having, an outer diameter, an inner diameter defining an inside region, a longitudinal axis, a first circular opening at one end and a second circular opening and integrally formed sealing means at the other end, the sealing means including a lid sealed with an original seal to the casing, said lid after breaking of the original seal forming a replaceable closure for the second opening, said second opening providing access to the inside region of the casing;
   a substantially cylindrical bottom piece having an outer diameter defining a periphery disposed within the first opening of the casing and permanently secured at its periphery to the casing; and
   volume defining means arranged inside and substantially perpendicular to the longitudinal axis of the casing such that part of the casing extends from the volume defining means towards the sealing means, which volume defining means together with the part of the casing extending from said volume defining means towards the sealing means defining a volume inside of the casing for holding tablets or the like.

2. A container according to claim 1, wherein the outer diameter of the bottom piece in a first region adjacent to the casing essentially corresponds to the inner diameter of the casing and wherein the outer diameter of the bottom piece in a second region bordering said first region essentially corresponds to the outer diameter of the casing.

3. A container according to claim 1 wherein said first region of the bottom piece is located inside the casing and in abutment with an internal surface of the casing.

4. A container according to claim 1, wherein said volume defining means is a disc-shaped, separate partition wall insert.

5. A container according to claim 1, wherein said volume is arranged to essentially correspond to the volume of tablets or the like contained within the casing.

6. A sealed container for tablets or the like, comprising:
   a cylindrical casing having, an outer diameter, an inner diameter defining an inside region, a first circular opening at one end and a second circular opening and integral sealing means at the other end, the sealing means including a removably attached lid sealed with an original seal to the casing, said lid after breaking of the original seal forming a replaceable closure for the second opening, the second opening providing access to the inside region of the casing;
   a substantially cylindrical bottom piece having a first outer diameter defining a periphery disposed within the first opening of the casing and being permanently secured at its periphery to the casing, said bottom piece having a second outer diameter disposed radially outwardly of said first outer diameter and disposed exteriorly of said casing, the bottom piece having an externally exposed recess spaced radially inwardly from its second outer diameter; and
   partitioning means arranged in the casing between the bottom piece and the sealing means such that part of the casing extends from the partitioning means towards the sealing means and part of the casing extends from the partitioning means towards the bottom piece, the partitioning means together with the part of the casing extending from the partitioning means towards the sealing means defining a first volume intended to hold tablets or the like and, together with the bottom piece and part of the casing extending from the partitioning means towards the bottom piece, defining a second volume.

7. A container according to claim 6, wherein the first outer diameter of the bottom piece in an annular first region, essentially corresponds to the inner diameter of the casing and wherein the second outer diameter of the bottom piece in a second region bordering said first region essentially corresponds to the outer diameter of the casing.

8. A container according to claim 7 wherein said first region of the bottom piece is in abutment with an internal surface of the casing.

9. A container according to claim 6 further including a stopper removably received within the recess of the bottom piece, the stopper being removable from said bottom piece and being insertable into the second opening of the casing after removal of the lid therefrom.

* * * * *